(12) United States Patent
Kakinohana et al.

(10) Patent No.: US 11,498,056 B2
(45) Date of Patent: Nov. 15, 2022

(54) MONOLITH SUBSTRATE, METHOD FOR PRODUCING MONOLITH SUBSTRATE, AND EXHAUST GAS PURIFICATION CATALYST COMPRISING MONOLITH SUBSTRATE

(71) Applicants: TOYOTA JIDOSHA KABUSHIKI KAISHA, Toyota (JP); DENSO CORPORATION, Kariya (JP); IBIDEN CO., LTD., Ogaki (JP)

(72) Inventors: Masaru Kakinohana, Toyota (JP); Tomoaki Sunada, Toyota (JP); Takeru Yoshida, Miyoshi (JP); Suguru Imamura, Kariya (JP); Shinnosuke Goto, Ogaki (JP); Koichi Uemura, Mizuho (JP)

(73) Assignees: TOYOTA JIDOSHA KABUSHIKI KAISHA, Toyota (JP); DENSO CORPORATION, Aichi (JP); IBIDEN CO., LTD., Ogaki (JP)

( * ) Notice: Subject to any disclaimer, the term of this patent is extended or adjusted under 35 U.S.C. 154(b) by 0 days.

(21) Appl. No.: 17/381,279

(22) Filed: Jul. 21, 2021

(65) Prior Publication Data
US 2022/0040676 A1    Feb. 10, 2022

(30) Foreign Application Priority Data

Aug. 5, 2020   (JP) .............................. JP2020-133395

(51) Int. Cl.

| | | |
|---|---|---|
| *B01D 53/94* | (2006.01) | |
| *B01J 21/04* | (2006.01) | |
| *B01J 23/46* | (2006.01) | |
| *B01J 35/02* | (2006.01) | |
| *B01J 35/04* | (2006.01) | |
| *B01J 35/10* | (2006.01) | |
| *B01J 37/00* | (2006.01) | |
| *B01J 37/04* | (2006.01) | |
| *B01J 37/08* | (2006.01) | |
| *F01N 3/28* | (2006.01) | |
| *F01N 3/10* | (2006.01) | |

(52) U.S. Cl.
CPC ......... *B01J 23/464* (2013.01); *B01D 53/945* (2013.01); *B01J 21/04* (2013.01); *B01J 35/023* (2013.01); *B01J 35/04* (2013.01); *B01J 35/1014* (2013.01); *B01J 35/1019* (2013.01); *B01J 37/0009* (2013.01); *B01J 37/04* (2013.01); *B01J 37/08* (2013.01); *B01D 2255/1023* (2013.01); *B01D 2255/1025* (2013.01); *B01D 2255/908* (2013.01); *B01D 2255/9155* (2013.01); *B01D 2255/9207* (2013.01); *F01N 3/101* (2013.01); *F01N 3/2803* (2013.01); *F01N 2370/02* (2013.01)

(58) Field of Classification Search
CPC . B01J 23/464; B01J 37/04; B01J 37/08; B01J 37/0009; B01J 35/04; B01J 35/023; B01J 35/1014; B01J 35/1019; B01J 21/04; B01D 53/945; B01D 2255/1023; B01D 2255/1025; B01D 2255/9155; B01D 2255/9207; B01D 2255/9087; F01N 2370/02; F01N 3/2803; F01N 3/101
See application file for complete search history.

(56) References Cited

U.S. PATENT DOCUMENTS

| | | | |
|---|---|---|---|
| 2003/0158035 A1 | 8/2003 | Ito et al. | |
| 2004/0092395 A1 | 5/2004 | Hase et al. | |
| 2012/0180464 A1* | 7/2012 | Wei | B01J 35/04 502/262 |
| 2013/0108530 A1* | 5/2013 | Chang | B01J 37/06 502/439 |

FOREIGN PATENT DOCUMENTS

| | | | | |
|---|---|---|---|---|
| EP | 1 287 876 A2 | * | 3/2003 | ............. B01J 23/63 |
| JP | H10202102 A | | 8/1998 | |
| JP | 2001232199 A | | 8/2001 | |
| JP | 2003170043 A | | 6/2003 | |
| JP | 2003236381 A | | 8/2003 | |
| JP | 2004066069 A | | 3/2004 | |
| JP | 2015085241 A | | 5/2015 | |
| JP | 2019063683 A | | 4/2019 | |
| WO | WO 2016 210 221 A1 | * | 12/2016 | .......... B01J 37/0248 |

* cited by examiner

*Primary Examiner* — Timothy C Vanoy
(74) *Attorney, Agent, or Firm* — Dickinson Wright, PLLC

(57) ABSTRACT

The present disclosure provides a monolith substrate used for an exhaust gas purifying catalyst that improves purification performance, a method for producing such monolith substrate, and an exhaust gas purifying catalyst comprising such monolith substrate. The present disclosure relates to a monolith substrate comprising an alumina-ceria-zirconia composite oxide and alumina, a method for producing such monolith substrate, and an exhaust gas purifying catalyst comprising such monolith substrate.

10 Claims, 1 Drawing Sheet

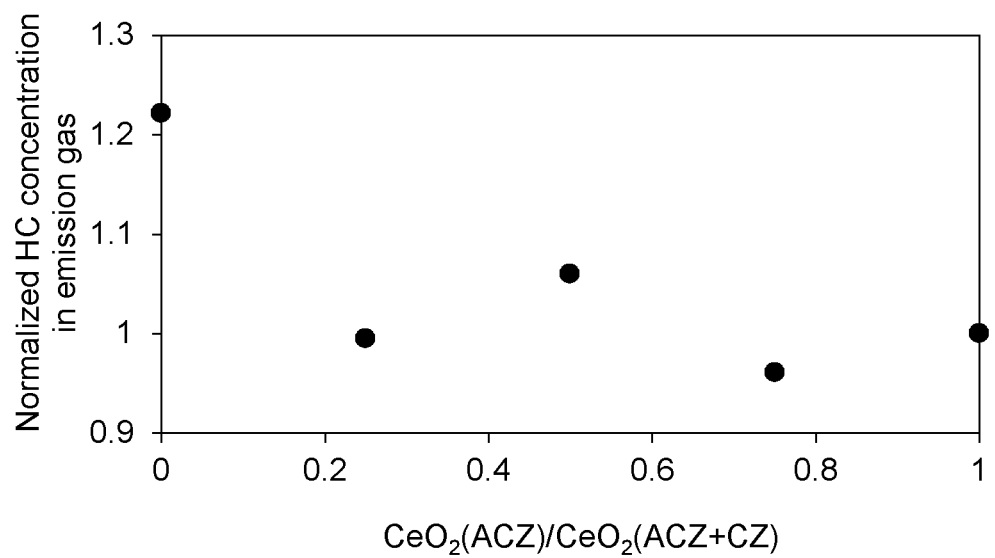

MONOLITH SUBSTRATE, METHOD FOR PRODUCING MONOLITH SUBSTRATE, AND EXHAUST GAS PURIFICATION CATALYST COMPRISING MONOLITH SUBSTRATE

CROSS REFERENCE TO RELATED APPLICATIONS

The present application claims priority from Japanese patent application JP 2020-133395 filed on Aug. 5, 2020, the entire content of which is hereby incorporated by reference into this application.

BACKGROUND

Technical Field

The present disclosure relates to a monolith substrate, a method for producing the monolith substrate, and an exhaust gas purifying catalyst comprising the monolith substrate.

Description of Related Art

Exhaust gases emitted from internal combustion engines of, for example, automobiles contain harmful gases, such as carbon monoxide (CO), nitrogen oxides (NOx), and unburned hydrocarbons (HC). An exhaust gas purifying catalyst for decomposing such harmful gases is also referred to as a three-way catalyst, and the catalyst generally comprises a honeycomb-like monolith substrate made of cordierite or the like and a catalyst layer provided on the substrate by subjecting the substrate to wash-coating with a slurry containing noble metal particles having catalytic activity. Various attempts have heretofore been made to improve the performance of such a catalyst.

For example, JP 2003-236381 A discloses a catalyst comprising a catalyst component directly supported on a surface of a support, wherein the catalyst component is directly supported on at least either elements or pores of the support, and force of the elements or pores of the support for supporting the catalyst component simulated by the density-functional approach is larger than 5 eV.

JP 2003-170043 A discloses a flow-type exhaust gas purifying catalyst comprising a honeycomb substrate on which a catalyst support and a catalyst component are supported, wherein at least 90% by weight each of the catalyst support and the catalyst component is provided in pores on cell walls of the honeycomb substrate.

JP 2004-066069 A discloses a ceramic catalyst comprising a ceramic support that can directly support a catalyst component on a surface of the ceramic substrate, and a primary catalyst component and a promoter component supported on the ceramic support, wherein the ceramic substrate has many pores, and the primary catalyst component and the promoter component are directly supported on the surface of the ceramic substrate (the surface includes inner surfaces of the pores).

JP 2015-085241 A discloses an exhaust gas purifying catalyst comprising a monolith substrate and noble metal particles supported on the monolith substrate, wherein the monolith substrate comprises ceria-zirconia composite oxide particles and θ-phase alumina particles, and a content of the ceria-zirconia composite oxide particles is 25% by weight or more based on the total weight.

JP 2019-063683 A discloses a method for producing a honeycomb catalyst having a honeycomb structure in which a plurality of through-holes are arranged in parallel in a longitudinal direction while isolated from each other by partition walls and a noble metal is supported thereon, which comprises a step of mixing ceria-zirconia composite oxide particles, alumina particles, and an inorganic binder to prepare a raw material paste, a step of subjecting the raw material paste to extrusion molding to obtain an extrusion-molded product in which a plurality of through-holes are arranged in parallel in a longitudinal direction while isolated from each other by partition walls, and a step of sintering the extrusion-molded product, wherein the ceria-zirconia composite oxide particles have $D_{CZ}50$ of 1.5 to 5.0 μm, the standard deviation of particle size distribution $\sigma_{CZ}$ is 2 or less, the alumina particles have $D_{AO}50$ of 1.5 to 5.0 μm, and the standard deviation of particle size distribution $\sigma_{AO}$ is 2 or less.

SUMMARY

An exhaust gas purifying catalyst prepared by supporting noble metal particles (the noble metal particles are optionally supported on the support) on a honeycomb monolith substrate as described in JP 2003-236381 A, JP 2003-170043 A, JP 2004-066069 A, JP 2015-085241 A, or JP 2019-063683 A can maintain a low pressure loss and have enhanced warm-up performance. However, the exhaust gas purification performance thereof was in need of improvement.

Under the above circumstances, the present disclosure provides a monolith substrate used for an exhaust gas purifying catalyst that improves purification performance, and, in particular, HC purification performance, a method for producing such monolith substrate, and an exhaust gas purifying catalyst comprising such monolith substrate.

In a monolith substrate used for the exhaust gas purifying catalyst as described in JP 2003-236381 A, JP 2003-170043 A, JP 2004-066069 A, JP 2015-085241 A, or JP 2019-063683 A, a ceria ($CeO_2$)-zirconia ($ZrO_2$) composite oxide can be used as a material having an oxygen storage/release capacity.

As a result of intensive studies, the inventors have found the following. As a material of the monolith substrate, an alumina ($Al_2O_3$)-ceria ($CeO_2$)-zirconia ($ZrO_2$) composite oxide having a higher oxygen storage/release speed than that of the ceria-zirconia composite oxide can be used instead of the ceria-zirconia composite oxide to provide an improved monolith substrate and an improved exhaust gas purifying catalyst. This has led to the completion of the present disclosure.

The present disclosure is summarized as follows.
(1) A monolith substrate comprising an alumina-ceria-zirconia composite oxide and alumina.
(2) The monolith substrate according to (1), wherein a content of the alumina-ceria-zirconia composite oxide is 8% by weight to 60% by weight relative to a total weight of the monolith substrate.
(3) The monolith substrate according to (1) or (2), wherein a content of the alumina is 40% by weight or more relative to a total weight of the monolith substrate.
(4) The monolith substrate according to any one of (1) to (3), which further comprises a ceria-zirconia composite oxide.
(5) The monolith substrate according to (4), wherein a weight ratio of ceria in the alumina-ceria-zirconia composite oxide ($CeO_2$ (ACZ)) relative to the ceria in the alumina-ceria-zirconia composite oxide and ceria in the ceria-zirconia composite oxide ($CeO_2$ (ACZ+CZ)) (i.e., $CeO_2$ (ACZ)/$CeO_2$ (ACZ+CZ)) is 0.1 or more.

(6) A method for producing the monolith substrate according to any one of (1) to (5) comprising:
  a step of mixing alumina-ceria-zirconia composite oxide particles, alumina particles, an alumina binder, and a solvent to prepare a mixture;
  a step of molding the mixture to prepare a monolith substrate molding; and
  a step of drying and firing the monolith substrate molding to produce the monolith substrate.
(7) The method according to (6), wherein a crystallite diameter of a ceria-zirconia composite oxide in the alumina-ceria-zirconia composite oxide particles is 30 nm or smaller.
(8) The method according to (6) or (7), wherein a specific surface area of the alumina-ceria-zirconia composite oxide particles determined by BET is 30 m$^2$/g or larger.
(9) The method according to any one of (6) to (8), wherein a specific surface area of the alumina particles determined by BET is 40 m$^2$/g to 200 m$^2$/g.
(10) An exhaust gas purifying catalyst comprising the monolith substrate according to any one of (1) to (5) and noble metal particles.

Effects

The present disclosure can provide a monolith substrate used for an exhaust gas purifying catalyst that improves purification performance, and, in particular, HC purification performance, a method for producing such monolith substrate, and an exhaust gas purifying catalyst comprising such monolith substrate.

BRIEF DESCRIPTION OF THE DRAWINGS

FIG. 1 shows a chart demonstrating the correlation between a weight ratio of ceria in an alumina-ceria-zirconia composite oxide (CeO$_2$ (ACZ)) relative to the ceria in the alumina-ceria-zirconia composite oxide and ceria in a ceria-zirconia composite oxide (CeO$_2$ (ACZ+CZ)) (i.e., CeO$_2$ (ACZ)/CeO$_2$ (ACZ+CZ)) and the normalized HC concentration in emission gas of exhaust gas purifying catalysts according to Comparative Example 1 and Examples 1 to 4.

DETAILED DESCRIPTION OF THE EMBODIMENTS

Hereafter, embodiments of the present disclosure are described in detail.

A monolith substrate according to the present disclosure, a method for producing the monolith substrate, and an exhaust gas purifying catalyst comprising the monolith substrate are not limited to the embodiments described below. Various types of modification, improvement, and the like that a person skilled in the art can implement can be performed within the scope of the present disclosure.

The present disclosure relates to a monolith substrate comprising an alumina-ceria-zirconia composite oxide and alumina, a method for producing such monolith substrate, and an exhaust gas purifying catalyst comprising such monolith substrate.

For example, an example of the monolith substrate includes a conventional honeycomb-shaped monolith substrate (e.g., a honeycomb structure, a honeycomb filter, and a high-density honeycomb).

The monolith substrate according to the present disclosure comprises an alumina-ceria-zirconia composite oxide.

In internal combustion engines of automobiles, an air-fuel ratio (A/F), which is a mixing ratio between air and fuel, can vary depending on operation conditions. For example, when fuel economy is to be improved and an amount of harmful gas is to be reduced in automobiles, the automobiles are operated at an air-fuel ratio with a higher air content; i.e., in a lean state. When a large output is required, such as at the time of starting or speeding, the automobiles are operated at an air-fuel ratio with a higher fuel ratio; i.e., in a rich state.

In such internal combustion engines with varying air-fuel ratio, a composition of an exhaust gas therefrom can also vary. Thus, an exhaust gas purifying catalyst that can sufficiently purify an exhaust gas, a composition of which may vary, is desired.

The monolith substrate comprises an alumina-ceria-zirconia composite oxide having a higher oxygen storage/release speed than that of a ceria-zirconia composite oxide instead of the ceria-zirconia composite oxide. Thus, the monolith substrate can rapidly implement oxygen storage/release and maintain oxygen concentration at a constant level even under conditions in which an air-fuel ratio varies (A/F transient conditions), in particular, the air-fuel ratio varies in a small fluctuation range, and, more specifically, a concentration change in an exhaust gas is small. Thus, an exhaust gas purifying catalyst produced by supporting noble metal particles on the monolith substrate can have a high capacity to keep the stoichiometric air/fuel ratio, a high capacity for exhaust gas purification, and, in particular, a high capacity for HC purification.

The alumina-ceria-zirconia composite oxide contained in the monolith substrate according to the present disclosure is composed of alumina-ceria-zirconia composite oxide particles.

In the alumina-ceria-zirconia composite oxide contained in the monolith substrate according to the present disclosure, ceria and zirconia are dispersed in alumina, and parts of ceria and zirconia form a ceria-zirconia solid solution. The ceria-zirconia solid solution formed of ceria and zirconia can be confirmed by, for example, powder x-ray diffraction (XRD).

The composition of the alumina-ceria-zirconia composite oxide contained in the monolith substrate according to the present disclosure is, in general, Ce:Zr of 1:5 to 3:1 and Al:(Ce+Zr) of 1:1 to 1:10 by mole ratio. The composition of the alumina-ceria-zirconia composite oxide contained in the monolith substrate according to the present disclosure varies depending on the composition of the alumina-ceria-zirconia composite oxide as a material used when producing the monolith substrate.

The composition of the alumina-ceria-zirconia composite oxide adjusted within the range described above can sufficiently yield effects of suppressing particle growth by alumina (improvement of heat stability and retention of a specific surface area), effects of retaining the oxygen storage/release capacity (OSC) by ceria, and effects of maintaining stabilization activity of ceria by zirconia.

The alumina-ceria-zirconia composite oxide contained in the monolith substrate according to the present disclosure may further comprise one or more elements selected from among rare earth elements other than cerium. Examples of these rare earth elements include scandium (Sc), yttrium (Y), lanthanum (La), praseodymium (Pr), neodymium (Nd), samarium (Sm), gadolinium (Gd), terbium (Tb), dysprosium (Dy), ytterbium (Yb), and lutetium (Lu). In some embodiments, the rare earth elements may be Y and La. The content of the rare earth element is generally 1% by weight to 20% by weight in the form of an oxide relative to the total weight of the alumina-ceria-zirconia composite oxide.

When the alumina-ceria-zirconia composite oxide comprises the rare earth element, heat resistance of the alumina-ceria-zirconia composite oxide can be improved, and OSC thereof can be improved.

The content of the alumina-ceria-zirconia composite oxide in the monolith substrate according to the present disclosure is generally 8% by weight to 60% by weight relative to the total weight of the monolith substrate. In some embodiments, such content may be 20% by weight to 50% by weight relative to the total weight of the monolith substrate. The content of the alumina-ceria-zirconia composite oxide in the monolith substrate according to the present disclosure varies depending on the amount of the alumina-ceria-zirconia composite oxide added as a material used when producing the monolith substrate.

The content of the alumina-ceria-zirconia composite oxide in the monolith substrate is adjusted within the range described above. Thus, the monolith substrate can rapidly implement oxygen storage/release and maintain oxygen concentration at a constant level even under conditions in which an air-fuel ratio varies, in particular, the air-fuel ratio varies in a small fluctuation range, and, more specifically, a concentration change in an exhaust gas is small. Thus, an exhaust gas purifying catalyst produced by supporting noble metal particles on the monolith substrate can have a higher capacity to keep the stoichiometric air/fuel ratio, a higher capacity for exhaust gas purification, and, in particular, a higher capacity for HC purification.

The monolith substrate according to the present disclosure comprises alumina.

The alumina in the monolith substrate according to the present disclosure includes alumina particles.

When the monolith substrate comprises the alumina particles, the alumina particles having higher heat resistance than the alumina-ceria-zirconia composite oxide can function as a supporting field of a noble metal and thus improve durability of the catalyst.

The alumina contained in the monolith substrate according to the present disclosure may further comprise, in addition to the alumina particles, alumina amorphous and/or fibers derived from an alumina binder and/or alumina fibers that can be added when producing the monolith substrate.

When the monolith substrate comprises the alumina amorphous and/or fibers, the alumina can function as a binder between oxide particles and/or a reinforcement material of a monolithic structure of the monolith substrate and thus, physical stability of the catalyst can be improved.

The content of the alumina in the monolith substrate according to the present disclosure is generally 40% by weight or more relative to the total weight of the monolith substrate. In some embodiments, such content may be 45% by weight to 60% by weight relative to the total weight of the monolith substrate. The content of the alumina in the monolith substrate according to the present disclosure varies depending on the amount of the alumina particles, the alumina binder, and the alumina fibers added as a material used when producing the monolith substrate.

The content of the alumina in the monolith substrate is adjusted within the range described above. Thus, the alumina can sufficiently function as a supporting field of a noble metal, and sufficient durability can be achieved, as described above.

The monolith substrate according to the present disclosure may further comprise a ceria-zirconia composite oxide.

The ceria-zirconia composite oxide that can be contained in the monolith substrate according to the present disclosure is composed of ceria-zirconia composite oxide particles.

When the monolith substrate comprises the ceria-zirconia composite oxide, sufficient OSC can be achieved.

The content of ceria in the ceria-zirconia composite oxide contained in the monolith substrate according to the present disclosure is 15% by weight or more. In some embodiments, such content of ceria may be 20% by weight or more. In some embodiments, such content of ceria may be 70% by weight or less. In some embodiments, such content of ceria may be 60% by weight or less. Furthermore, the content of zirconia in the ceria-zirconia composite oxide is 80% by weight or less. In some embodiments, such content of zirconia may be 70% by weight or less. Such ceria-zirconia composite oxide has a small heat capacity. Thus, temperature of the monolith substrate can be easily raised, and warm-up performance of the catalyst can be improved. The composition of the ceria-zirconia composite oxide contained in the monolith substrate according to the present disclosure varies depending on the composition of the ceria-zirconia composite oxide used as a material when producing the monolith substrate.

The ceria-zirconia composite oxide contained in the monolith substrate according to the present disclosure may further comprise one or more elements selected from among rare earth elements other than cerium. Examples of the rare earth elements include scandium (Sc), yttrium (Y), lanthanum (La), praseodymium (Pr), neodymium (Nd), samarium (Sm), gadolinium (Gd), terbium (Tb), dysprosium (Dy), ytterbium (Yb), and lutetium (Lu). In some embodiments, the rare earth elements may be Y and La. The content of the rare earth element is generally 5% by weight to 25% by weight in the form of an oxide relative to the total weight of the ceria-zirconia composite oxide.

When the ceria-zirconia composite oxide comprises the rare earth element, heat resistance of the ceria-zirconia composite oxide can be improved, and OSC thereof can be improved.

Regarding the content of the ceria-zirconia composite oxide in the monolith substrate according to the present disclosure, when the ceria-zirconia composite oxide is present, the weight ratio of ceria in the alumina-ceria-zirconia composite oxide contained in the monolith substrate ($CeO_2$ (ACZ)) relative to the ceria in the alumina-ceria-zirconia composite oxide and ceria in the ceria-zirconia composite oxide contained in the monolith substrate ($CeO_2$ (ACZ+CZ)) (i.e., $CeO_2$ (ACZ)/$CeO_2$ (ACZ+CZ)) is generally adjusted to be at least 0.1. In some embodiments, such weight ratio may be adjusted to be at least 0.2. In some embodiments, such weight ratio may be adjusted to be at least 0.5. The upper limit of the weight ratio is not limited because it is not necessary that the monolith substrate according to the present disclosure comprises the ceria-zirconia composite oxide. The content of the ceria-zirconia composite oxide in the monolith substrate according to the present disclosure varies depending on the amount of the ceria-zirconia composite oxide added as a material used when producing the monolith substrate.

The content of the ceria-zirconia composite oxide in the monolith substrate is adjusted within the range described above on the basis of the content of the alumina-ceria-zirconia composite oxide. Thus, the monolith substrate can rapidly implement oxygen storage/release and maintain oxygen concentration at a constant level even under conditions in which an air-fuel ratio varies, in particular, the air-fuel ratio varies in a small fluctuation range, and, more specifically, a concentration change in an exhaust gas is small. Thus, an exhaust gas purifying catalyst produced by supporting noble metal particles on the monolith substrate can have a higher capacity to keep the stoichiometric air/fuel ratio, a higher capacity for exhaust gas purification, and, in particular, a higher capacity for HC purification.

The monolith substrate according to the present disclosure can be produced in the same manner as with the case of a conventional cordierite substrate except for the use of, as materials, an alumina-ceria-zirconia composite oxide, alumina, and, optionally, a ceria-zirconia composite oxide described below. For example, to a mixture of alumina-ceria-zirconia composite oxide particles and alumina particles, water as a solvent and binders, such as an alumina binder and/or alumina fibers are added, and the resultant is kneaded and molded using an extruder. The molded product is then dried with the use of, for example, a microwave dryer, a hot-air dryer, a dielectric dryer, a decompression dryer, a vacuum dryer, or a freeze dryer. Thereafter, the dried product is fired at, for example, 900° C. to 1,200° C. for 1 hour to 24 hours, in general. Thus, the monolith substrate can be produced.

As a material used when producing the monolith substrate according to the present disclosure, an alumina-ceria-zirconia composite oxide known in the art, such as the material disclosed in JP H10-202102 A or JP 2001-232199 A, may be used.

For example, the alumina-ceria-zirconia composite oxide can be prepared by the alkoxide method or the coprecipitation method. By preparing the alumina-ceria-zirconia composite oxide by the alkoxide method or the coprecipitation method, the composite oxide composed of uniform and fine primary particles can be prepared, and the composite oxide comprising a ceria-zirconia solid solution can be easily prepared.

According to the alkoxide method, for example, all metal alkoxides of aluminum, cerium, zirconium, and, optionally, rare earth elements are mixed, and the mixture is hydrolyzed, followed by firing. Thus, the alumina-ceria-zirconia composite oxide can be prepared. Alternatively, it is not necessary to use all of aluminum, cerium, zirconium, and, optionally, rare earth elements, as metal alkoxides. As long as at least one thereof is used as a metal alkoxide, other metals can be used in the form of a solution of nitrate salt, acetyl acetate salt, or the like.

Such metal alkoxide may be any of methoxide, ethoxide, or butoxide. In some embodiments, a metal alkoxide exhibiting a high solubility in an alcohol solvent may be used. Any alcohol solvent may be used.

According to the coprecipitation method, for example, all metal water-soluble salts such as all metal nitrate salts of aluminum, cerium, zirconium, and, optionally, rare earth elements are mixed, and the mixture is coprecipitated in the form of hydroxides with the aid of aqueous ammonia or the like, followed by firing. Thus, the alumina-ceria-zirconia composite oxide can be prepared. Alternatively, it is not necessary to use all of aluminum, cerium, zirconium, and, optionally, rare earth elements as water-soluble salts. As long as at least one thereof is used as a water-soluble salt, other metals can be used in the form of a solid, such as metal powder or oxide powder.

In general, the alumina-ceria-zirconia composite oxide thus obtained may be subjected to heat treatment in advance at 500° C. to 900° C. By subjecting the alumina-ceria-zirconia composite oxide to heat treatment in advance, excessive crystal growth of particles can be suppressed, and lowering of OSC after long-term use can further be suppressed.

In some embodiments, crystallites of a ceria-zirconia composite oxide in the alumina-ceria-zirconia composite oxide may be fine. In general, the crystallite diameter is 30 nm or less. In some embodiments, such crystallite diameter may be 5 nm to 20 nm. The crystallite diameter of the ceria-zirconia composite oxide can be measured with, for example, a full-width at half maximum by XRD.

When the crystallite diameter of the ceria-zirconia composite oxide in the alumina-ceria-zirconia composite oxide is adjusted within the range described above, sufficient effects of retaining OSC by ceria can be obtained.

The specific surface area of the alumina-ceria-zirconia composite oxide determined by BET is generally 30 $m^2/g$ or more. In some embodiments, the specific surface area of the alumina-ceria-zirconia composite oxide determined by BET may be 40 $m^2/g$ to 80 $m^2/g$.

When the specific surface area of the alumina-ceria-zirconia composite oxide determined by BET is adjusted within the range described above, sufficient effects of retaining OSC by ceria can be obtained.

As materials used when producing the monolith substrate according to the present disclosure, alumina particles, an alumina binder, alumina fibers, and the like can be used as alumina.

Alumina particles that are commonly commercialized as catalyst supports in the art can be used.

When the alumina particles are used as alumina, the alumina particles having higher heat resistance than the alumina-ceria-zirconia composite oxide can function as a supporting field of a noble metal and thus improve durability of the catalyst.

The alumina particles are not limited, and examples thereof include α-phase alumina particles, θ-phase alumina particles, and δ-phase alumina particles. In some embodiments, the alumina particles may be θ-phase alumina particles or δ-phase alumina particles. The crystalline structure of the alumina particles can be determined by, for example, powder X-ray diffraction (XRD).

When θ-phase alumina particles or δ-phase alumina particles that generally have large surface areas are used as alumina particles, large surface areas can be maintained even after such alumina particles are incorporated into the monolith substrate according to the present disclosure, and deterioration of a noble metal can be suppressed.

The specific surface area of the alumina particles determined by BET is generally 40 $m^2/g$ to 200 $m^2/g$. In some embodiments, the specific surface area of the alumina particles determined by BET may be 50 $m^2/g$ to 150 $m^2/g$.

When the specific surface area of the alumina particles determined by BET is adjusted within the range described above, the alumina particles can function as a supporting field of the metal and then improve durability of the catalyst.

An alumina binder and alumina fibers that are commonly commercialized in the art can be used.

When the alumina binder is used as alumina, the alumina binder can function as a binder between oxide particles, and thus, physical stability of the monolith substrate can be improved. In addition, when the alumina fibers are used as alumina, the alumina fibers can function as a reinforcement material of a monolithic structure of the monolith substrate and thus, physical stability of the monolith substrate can be improved.

Concerning a material used when producing the monolith substrate according to the present disclosure, a ceria-zirconia composite oxide is a material used as a promoter (an oxygen storage material) in a conventional exhaust gas purifying catalyst, and the detail thereof is known in the art. In some embodiments, in the ceria-zirconia composite oxide, ceria and zirconia form a solid solution. The ceria-zirconia composite oxide can be prepared by the alkoxide method or the coprecipitation method. According to the coprecipitation method, for example, to an aqueous solution in which a cerium salt (e.g., cerium nitrate) and a zirconium salt (e.g., oxy-zirconium nitrate) are dissolved, aqueous ammonia is added to form a coprecipitate, and the resulting coprecipitate is dried, and, in general, the dried coprecipitate is then fired at 400° C. to 500° C. for approximately 5 hours. Thus, the ceria-zirconia composite oxide can be prepared.

In comparison with the ceria-zirconia composite oxide, particles (crystals) of the alumina-ceria-zirconia composite oxide are less likely to grow even at high temperature such as a firing temperature of the monolith substrate. Accordingly, diameters of the particles of the alumina-ceria-zirconia composite oxide in the produced monolith substrate are equivalent to or slightly larger than those of the particles of the alumina-ceria-zirconia composite oxide used as materials of the monolith substrate even in view of the particle (crystal) growth caused by firing when producing the monolith substrate. Accordingly, the particles of the alumina-ceria-zirconia composite oxide contained in the monolith substrate according to the present disclosure thus obtained can have small particle diameters; i.e., large specific surface areas, and thus, high OSC even after the monolith substrate is produced.

An exhaust gas purifying catalyst produced with the use of the monolith substrate according to the present disclosure is composed of the monolith substrate according to the present disclosure and noble metal particles supported thereon. In some embodiments, noble metal particles are of platinum-group metals. In some embodiments, noble metal particles are of one or more metals selected from Pt, Rh, and Pd. In some embodiments, the noble metal particles may be supported on the monolith substrate in accordance with a conventional technique. For example, a promoter (an oxygen storage material), a support, a binder, and the like may be mixed with the noble metal particles to prepare a slurry, and the monolith substrate may then be subjected to wash-coating with the resulting slurry. However, since the monolith substrate according to the present disclosure can serve as a promoter or support by itself, a high purification capacity can be expected even when the monolith substrate directly supports the noble metal particles thereon. In order to reduce cold-HC, it is effective to lower the thermal capacity of the three-way catalyst. Since the thermal capacity of the catalyst can be lowered by removing a wash coat, a higher HC purification capacity can be expected thereby. The noble metals can be supported on the substrate with the aid of a common reagent, such as palladium nitrate or rhodium chloride.

The exhaust gas purifying catalyst according to the present disclosure can have a higher capacity to keep the stoichiometric air/fuel ratio, a higher capacity for exhaust gas purification, and, in particular, a higher capacity for HC purification since the monolith substrate contained in the exhaust gas purifying catalyst rapidly implements oxygen storage/release and maintains oxygen concentration at a constant level even under conditions in which an air-fuel ratio varies, and, in particular, the air-fuel ratio varies in a small fluctuation range (e.g., under the conditions in which the air-fuel ratio varies in a range of 14.6±0.2 (14.4 to 14.8)).

EXAMPLES

Hereafter, the present disclosure is described in greater detail with reference to the examples, although the present disclosure is not limited to these examples.

1. Preparation of Three-Way Catalyst

The exhaust gas purifying catalysts of Comparative Example 1 and Examples 1 to 4 were prepared with the use of $Al_2O_3$—$CeO_2$—$ZrO_2$ composite oxide particles (ACZ) and $CeO_2$—$ZrO_2$ composite oxide particles (CZ) having the compositions shown in Table 1 in accordance with the specifications shown in Tables 2 and 3.

The exhaust gas purifying catalyst of Comparative Example 1 was prepared using the monolith substrate comprising the $CeO_2$—$ZrO_2$ composite oxide particles, $Al_2O_3$ particles, $La_2O_3$ particles and $Y_2O_3$ particles as rare earth elements, an $Al_2O_3$ binder, and $Al_2O_3$ fibers which was produced by firing at 1,150° C. This monolith substrate was considered to function as a support of noble metal particles (catalyst) and a promoter by itself. Thus, a given amount of noble metals was supported directly on the substrate without wash coating. Specifically, necessary amounts of palladium nitrate and rhodium chloride were dispersed in an aqueous solution, and the substrate was immersed and allowed to stand in the aqueous solution for a given period of time. Thus, noble metals were supported on the substrate. The substrate capacity of the exhaust gas purifying catalyst of Comparative Example 1 was 0.9 l.

The exhaust gas purifying catalysts of Examples 1 to 4 were prepared using the monolith substrate comprising the $Al_2O_3$—$CeO_2$—$ZrO_2$ composite oxide particles, $Al_2O_3$ particles, $La_2O_3$ particles and $Y_2O_3$ particles as rare earth elements, an $Al_2O_3$ binder, $Al_2O_3$ fibers, and, optionally, the $CeO_2$—$ZrO_2$ composite oxide particles which was produced by firing at 1,150° C. This monolith substrate was considered to function as a support of a catalyst and a promoter by itself. Thus, a given amount of noble metals was supported directly on the substrate without wash coating. Specifically, necessary amounts of palladium nitrate and rhodium chloride were dispersed in an aqueous solution, and the substrate was immersed and allowed to stand in the aqueous solution for a given period of time. Thus, noble metals were supported on the substrate. The substrate capacity of the exhaust gas purifying catalysts of Examples 1 to 4 was 0.9 l.

TABLE 1

|  | $Al_2O_3$ | $CeO_2$ | $ZrO_2$ | $La_2O_3$ | $Y_2O_3$ |
|---|---|---|---|---|---|
| ACZ composition* | 30 | 27 | 35 | 4 | 4 |
| CZ composition* | — | 30 | 60 | 5 | 5 |

*Unit: % by weight in each material

TABLE 2

| | Substrate composition* | | | |
|---|---|---|---|---|
| | ACZ | CZ | $Al_2O_3$ | $Al_2O_3$ binder and $Al_2O_3$ fibers |
| Comp. Ex. 1 | 0.0% | 50.0% | 25.0% | 25.0% |
| Ex. 1 | 34.1% | 11.4% | 29.5% | 25.0% |
| Ex. 2 | 23.6% | 21.3% | 30.1% | 25.0% |
| Ex. 3 | 10.9% | 32.8% | 31.2% | 25.0% |
| Ex. 4 | 47.0% | 0.0% | 28.0% | 25.0% |

*Unit: % by weight in each substrate

TABLE 3

|  | CeO$_2$ (ACZ)/<br>CeO$_2$ (CZ + ACZ)<br>Weight ratio | Substrate<br>specification | Noble metals<br>Pd-Rh<br>(g/l) |
|---|---|---|---|
| Comp. Ex. 1 | 0 | 4 mil/600 cells | 1.5-0.25 |
| Ex. 1 | 0.73 | 4 mil/600 cells | 1.5-0.25 |
| Ex. 2 | 0.50 | 4 mil/600 cells | 1.5-0.25 |
| Ex. 3 | 0.23 | 4 mil/600 cells | 1.5-0.25 |
| Ex. 4 | 1 | 4 mil/600 cells | 1.5-0.25 |

2. Durability Test

The exhaust gas purifying catalysts of Comparative Example 1 and Examples 1 to 4 were mounted immediately below a 4.6-liter V8 engine. A complex pattern involving cyclic A/F change was employed, and the durability test was performed at floor temperature of 950° C. for 50 hours.

3. Evaluation of Exhaust Gas Purifying Catalysts

The exhaust gas purifying catalysts subjected to the durability test in above 2. were mounted on a 2.5-liter straight-four engine, and HC concentrations in an emission gas from the exhaust gas purifying catalysts were measured under conditions in which rich (air-fuel ratio: 14.4)/lean (air-fuel ratio: 14.8) conversion was repeated at an intake gas temperature of 550° C.

Subsequently, the HC concentrations in the emission gas from the exhaust gas purifying catalysts of Comparative Example 1 and Examples 1 to 4 were each divided by the HC concentration in the emission gas from the exhaust gas purifying catalyst of Example 4 to determine the normalized HC concentrations in the emission gas for the exhaust gas purifying catalysts of Comparative Example 1 and Examples 1 to 4.

FIG. 1 shows the correlation between a weight ratio of CeO$_2$ in the Al$_2$O$_3$—CeO$_2$—ZrO$_2$ composite oxide (CeO$_2$ (ACZ)) relative to the CeO$_2$ in the Al$_2$O$_3$—CeO$_2$—ZrO$_2$ composite oxide and CeO$_2$ in the CeO$_2$—ZrO$_2$ composite oxide (CeO$_2$ (ACZ+CZ)) (i.e., CeO$_2$ (ACZ)/CeO$_2$ (ACZ+CZ)) and the normalized HC concentration in the emission gas of the exhaust gas purifying catalysts according to Comparative Example 1 and Examples 1 to 4.

FIG. 1 demonstrate that a high HC purification capacity can be achieved by adjusting CeO$_2$ (ACZ)/CeO$_2$ (ACZ+CZ) in the monolith substrate of the exhaust gas purifying catalyst to 0.1 or higher. Furthermore, FIG. 1 demonstrate that the high HC purification capacity can be achieved by adjusting CeO$_2$ (ACZ)/CeO$_2$ (ACZ+CZ) in the monolith substrate of the exhaust gas purifying catalyst to 0.2 or higher.

All publications, patents and patent applications cited in the present description are herein incorporated by reference as they are.

What is claimed is:

1. A monolith substrate comprising an alumina-ceria-zirconia composite oxide and alumina.

2. The monolith substrate according to claim 1, wherein a content of the alumina-ceria-zirconia composite oxide is 8% by weight to 60% by weight relative to a total weight of the monolith substrate.

3. The monolith substrate according to claim 1, wherein a content of the alumina is 40% by weight or more relative to a total weight of the monolith substrate.

4. The monolith substrate according to claim 1, which further comprises a ceria-zirconia composite oxide.

5. The monolith substrate according to claim 4, wherein a weight ratio of ceria in the alumina-ceria-zirconia composite oxide (CeO$_2$ (ACZ)) relative to the ceria in the alumina-ceria-zirconia composite oxide and ceria in the ceria-zirconia composite oxide (CeO$_2$ (ACZ+CZ)) (i.e., CeO$_2$ (ACZ)/CeO$_2$ (ACZ+CZ)) is 0.1 or more.

6. A method for producing the monolith substrate according to claim 1 comprising:
    a step of mixing alumina-ceria-zirconia composite oxide particles, alumina particles, an alumina binder, and a solvent to prepare a mixture;
    a step of molding the mixture to prepare a monolith substrate molding; and
    a step of drying and firing the monolith substrate molding to produce the monolith substrate.

7. The method according to claim 6, wherein a crystallite diameter of a ceria-zirconia composite oxide in the alumina-ceria-zirconia composite oxide particles is 30 nm or smaller.

8. The method according to claim 6, wherein a specific surface area of the alumina-ceria-zirconia composite oxide particles determined by BET is 30 m$^2$/g or larger.

9. The method according to claim 6, wherein a specific surface area of the alumina particles determined by BET is 40 m$^2$/g to 200 m$^2$/g.

10. An exhaust gas purifying catalyst comprising the monolith substrate according to claim 1 and noble metal particles.

* * * * *